United States Patent
Lavalle et al.

(10) Patent No.: US 12,392,914 B2
(45) Date of Patent: Aug. 19, 2025

(54) MEASURING TOOL FOR IRRADIATION SOURCE AND METHOD FOR MEASURING RADIATION

(71) Applicant: Tetra Laval Holdings & Finance S.A., Pully (CH)

(72) Inventors: Marco Lavalle, Formigine (IT); Giulio Paolo Veronese, Zola predosa (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 372 days.

(21) Appl. No.: 17/309,324

(22) PCT Filed: Nov. 13, 2019

(86) PCT No.: PCT/EP2019/081224
§ 371 (c)(1),
(2) Date: May 19, 2021

(87) PCT Pub. No.: WO2020/104280
PCT Pub. Date: May 28, 2020

(65) Prior Publication Data
US 2022/0011455 A1    Jan. 13, 2022

(30) Foreign Application Priority Data
Nov. 23, 2018 (EP) .................... 18208123

(51) Int. Cl.
*G01T 7/00* (2006.01)
*B65B 55/08* (2006.01)
(Continued)

(52) U.S. Cl.
CPC .............. *G01T 7/005* (2013.01); *B65B 55/08* (2013.01); *G01T 1/023* (2013.01); *G01T 1/026* (2013.01); *G01T 1/12* (2013.01)

(58) Field of Classification Search
CPC ......... G01T 7/005; G01T 1/023; G01T 1/026; G01T 1/12; B65B 55/08
(Continued)

(56) References Cited

U.S. PATENT DOCUMENTS

| 4,785,186 A | 11/1988 | Street et al. | |
|---|---|---|---|
| 5,825,037 A * | 10/1998 | Nablo | H01J 33/02 |
| | | | 250/492.3 |

(Continued)

FOREIGN PATENT DOCUMENTS

| CN | 1918483 A | 2/2007 |
|---|---|---|
| CN | 102805628 A | 12/2012 |

(Continued)

OTHER PUBLICATIONS

International Search Report and Written Opinion of PCT/EP2019/081224, dated May 28, 2020 in 8 pages.

*Primary Examiner* — Carolyn Fin
(74) *Attorney, Agent, or Firm* — Knobbe Martens Olson & Bear LLP

(57) ABSTRACT

A measuring tool (1) for measuring a delivered dose of radiation emitted by at least one electron beam emitter (2a-b) in an irradiation area (2) used to sterilise packaging material to be later formed into a package is provided. The measuring tool (1) comprises: at least one transducer (3) configured to convert a characteristic of the delivered dose of radiation to another characteristic; a frame (5) configured to hold the at least one transducer (3) and insert the at least one transducer (3) into the irradiation area (2); and at least one connector (7) configured to allow signal transfer from the at least one transducer (3) to a read-out system (9) remote of the irradiation area (2). Use of said tool and a method for calibrating a radiation dose emitted by at least one electron beam emitter (2a-b) in an irradiation area (2)

(Continued)

used to sterilise packaging material to be later formed into a package are also provided.

15 Claims, 5 Drawing Sheets

(51) Int. Cl.
    *G01T 1/02*     (2006.01)
    *G01T 1/12*     (2006.01)
(58) Field of Classification Search
    USPC ........................................................ 250/252.1
    See application file for complete search history.

(56) References Cited

U.S. PATENT DOCUMENTS

| | | | |
|---|---|---|---|
| 7,641,851 B2 * | 1/2010 | Williams | A61L 2/28 436/1 |
| 7,706,506 B1 * | 4/2010 | Woodruff | H01J 35/13 378/66 |
| 2002/0129659 A1 | 9/2002 | Nelson et al. | |
| 2007/0114432 A1 * | 5/2007 | Kristiansson | A61L 2/087 250/397 |
| 2015/0369669 A1 * | 12/2015 | Kassovski | G01J 5/0803 250/338.3 |
| 2017/0319729 A1 * | 11/2017 | Omrane | A61L 2/087 |

FOREIGN PATENT DOCUMENTS

| | | |
|---|---|---|
| CN | 103842850 A | 6/2014 |
| CN | 104080486 A | 10/2014 |
| CN | 106029112 A | 10/2016 |
| EP | 2737909 | 6/2014 |
| EP | 2755052 | 7/2014 |
| JP | H01-321318 A | 12/1989 |
| JP | H07-146372 A | 6/1995 |
| JP | 2016-505454 A | 2/2016 |
| WO | WO 2007/145560 | 12/2007 |

* cited by examiner

MEASURING TOOL FOR IRRADIATION SOURCE AND METHOD FOR MEASURING RADIATION

TECHNICAL FIELD

The invention relates to a measuring tool for measuring a delivered dose of radiation and a method for measuring radiation. Specifically, the tool and method are configured to be used in an irradiation area used to sterilise a web of packaging material to be later formed into a plurality of packages.

BACKGROUND ART

When a package is filled with a food product it is required that the material of the package is sterilised in such a way that the pasteurized (or by other means treated) product can be added aseptically, before the package is being sealed.

To extend the shelf-life of food products it is known to sterilise the packaging material before it is formed into filled packages. Depending on the desired shelf-life, and whether the distribution and storage is made in chilled or ambient temperature, different levels of sterilisation may be chosen. However, complete microbiological killing is normally provided.

One way of sterilising is to irradiate the packaging material by electrons emitted from an electron beam unit. In order to achieve a sufficient sterilisation while keeping the delivered dose of radiation minimal, the delivered dose needs to be correct. Thusly, a measurement of the delivered dose of radiation is performed during installation, and periodically about every few hundreds of hours of run-time, such as every 500-1000 hour, followed by calibration and verification of the electron beam unit.

Some electron beam emitters comprise their own measurement equipment, however these have been found to be associated with some disadvantages. They may be inaccurate, they may drift, and they may be associated with a undesired noise level. In order to minimise these problems, periodic recalibration of this equipment may be beneficial.

Emitters also usually have recommended calibration settings, however these do not necessarily reflect the specific environment that the emitters will be used in during normal operation. Hence, further measurement of the delivered dose of radiation is needed.

Today, within food packaging, such as packaging of liquid food in individual packages, this measurement is a dosimetric measurement by means of a radiochromic film attached to the packaging material. The film is run through the irradiation area as the packaging material passes the electron beam emitter, and the dose is then read by a hand operated, calibrated measuring system. The data analysis must be done by hand and therefore takes an undesirably long time. If any mistakes are made in this long and detailed process, this will not be apparent until after the process is complete.

The prior art successfully measures the delivered dose of radiation. However, it wastes packaging material, takes a long time and requires skilled technicians trained on dosimetry.

SUMMARY

It is an object of the invention to at least partly overcome one or more of the above-identified limitations of the prior art. In particular, it is an object to provide a measuring tool that is fast and simple to use and doesn't require an interruption of normal procedure.

According to a first aspect of the invention, the above and other objects of the invention are achieved, in full or at least in part, by a measuring tool for measuring a delivered dose of radiation emitted by at least one electron beam emitter in an irradiation area used to sterilise packaging material to be later formed into a package is provided. The measuring tool comprises: at least one transducer configured to convert a characteristic of the delivered dose of radiation to another characteristic; a frame configured to hold the at least one transducer and to be inserted into the irradiation area; and at least one connector configured to allow signal transfer from the at least one transducer to a read-out system remote of the irradiation area.

The measuring tool is advantageous in that it is fast and simple to use and doesn't require an interruption of normal procedure.

At least one of the at least one transducer may be a thermocouple.

The thermocouple is advantageous in that a lot of heat is produced by the irradiation process, meaning that thermocouples will yield exact measurements.

At least one thermocouple may further be coupled with at least one passive element.

The passive element is advantageous in that it may have a larger area than the transducer and will not expose the transducer directly to damaging radiation.

At least one of the at least one transducer may be a charge collector.

The charge collector is advantageous in that it is easy to use and to transmit the measurement result.

At least one charge collector may comprise at least one metallic or semiconducting element.

The metallic or semiconducting element is advantageous in that it increases the efficiency of the charge collector.

At least one charge collector may comprise at least one metallic or semiconducting wire inserted into a hollow tube of shielding with at least one slit.

The wire inserted into a hollow tube of shielding with at least one slit is advantageous in that it provides a reliable measurement of the delivered dose of radiation while exposing the charge collector to a minimal amount of radiation.

At least one charge collector may be coated with a radiation resistant material.

The radiation resistant material is advantageous in that it will increase the durability and the stability of the transducer.

At least one of the at least one transducer may be a scintillator.

The scintillator is advantageous in that it is well established for measuring radiation and will yield standardised and reliable measurements.

At least one scintillator may be coated with a radiation resistant material.

The radiation resistant material is advantageous in that it will increase the durability and the stability of the transducer.

At least one of the at least one transducer may be a thin film solid state detector.

The thin film solid state detector is advantageous in that it may be made very small and thin.

The thin film solid state detector may comprise at least two active layers arranged at different distances from the electron beam emitter.

The at least two active layers arranged at different distances from the emitter may provide a set of individual signals from which an information related to the energy of the impinging radiation may be derived.

At least one thin film solid state detector may be coated with a radiation resistant material.

The radiation resistant material is advantageous in that it will increase the durability and the stability of the transducer.

At least one transducer may be coupled to a cooling element.

The cooling element is advantageous in that the radiation area may have a high enough temperature to damage the transducers and/or the frames.

The cooling element may be coupled to a passive element to be inserted into the irradiation area and configured to keep the passive element at a fixed temperature.

Keeping the passive element at a fixed temperature is advantageous in that it is easy to measure and standardise.

At least one transducer may further comprise a shielding.

The shielding is advantageous in that it will increase the durability and the stability of the transducer, and allow for directed or spatial measurements.

The shielding may have at least one slit.

The slit is advantageous in that it allows for more directed spatial measurements and reduces the radiation hitting the transducers, thereby increase the durability and the stability of the transducer.

At least one transducer may further comprise a low energy filtering shielding.

The low energy filtering shielding is advantageous in that it reduces noise.

At least one transducer may comprise at least one shielding layer directly exposed to impinging radiation; at least one active layer for detecting radiation; and at least one intermediate insulating layer between the shielding layer and the active layer.

The layers are advantageous in that they protect the measuring parts of the transducer while remaining substantially flat. The shielding layer may preferably be metallic and/or grounded. The insulating layer may be electrically and/or thermally insulating.

At least one transducer may be one-sided.

The one-sided transducer is advantageous in that it allows for measurement of only one electron emitter in a tunnel with electron emitters on several sides.

At least one transducer may be double-sided.

The double-sided transducer is advantageous in that it allows for measurement of several electron emitters in a tunnel with electron emitters on several sides.

The at least one transducer and the frame may be substantially flat in a common plane.

Being substantially flat is advantageous in that the tool may then fit in any irradiation area.

The frame may comprise a shutter that allows for alternatingly exposing at least one transducer to the irradiation area.

The shutter is advantageous in that it allows the at least one transducer to be exposed to radiation only after environment stabilisation.

The frame may comprise a motor being configured to provide automated insertion of the at least one transducer into the irradiation area.

The motor is advantageous in that it allows for automation or assistance and a precise exposure time of the tool in the radiation area, to prolong the durability of the tool.

The frame may comprise a handle configured to assist during the insertion of the at least one transducer into the irradiation area.

The handle is advantageous in that it makes the tool easier to use.

The handle may further be configured to stabilise the frame while in use.

The stabilisation is advantageous in that it allows for more reliable measurements.

The tool may further comprise several transducers with a predetermined spatial resolution arranged in a two-dimensional matrix.

The transducers with a predetermined spatial resolution arranged in a two-dimensional matrix are advantageous in that it allows for a two-dimensional, spatial measurement.

The read-out system may be configured to provide a spatial map of the radiation profile emitted by the at least one electron beam emitter.

The spatial map is advantageous in that it allow for more precise diagnostics and calibration of the electron emitters.

According to a second aspect, use of a measuring tool according to the first aspect in order to measure a radiation dose emitted by at least one electron beam emitter in an irradiation area is provided.

Using the measuring tool in this way is advantageous in that it is fast and simple to use and doesn't require an interruption of normal procedure.

According to a third aspect, a method for calibrating a radiation dose emitted by at least one electron beam emitter in an irradiation area used to sterilise packaging material to be made into a package is provided. The method comprises the steps of: inserting at least one transducer into the irradiation area using a frame; measuring the delivered dose of radiation emitted in the irradiation area using the at least one transducer; and transmitting the measurement to a read-out system remote of the irradiation area using at least one connector.

This method is advantageous in that it is fast and simple and doesn't require an interruption of normal procedure.

The method may further comprise a step of removing the packaging material from the irradiation area prior to inserting the at least one transducer.

Removing the packaging material is advantageous in that the packaging material may interfere with the measurements and removing it more closely resembles the actual production environment.

The inserting step may be performed automatically.

Automatic insertion is advantageous in that it reduces the possibility of human error.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
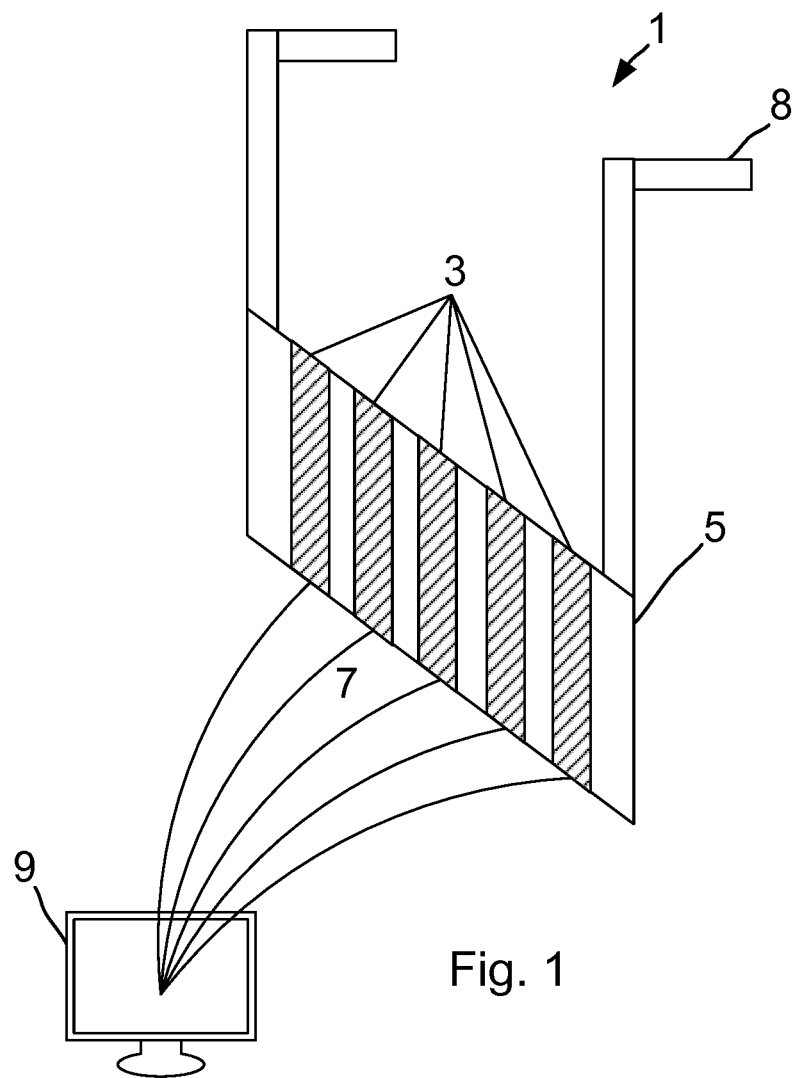
FIG. 1 is a perspective view of a measuring tool according to an embodiment.

With reference to FIG. 1, a measuring tool 1 is illustrated. The measuring tool 1 is configured to measure a delivered dose of radiation emitted by at least one electron beam emitter 2a-b in an irradiation area 2 (shown in FIGS. 3-4) used to sterilise packaging material to be later formed into a package, such as a package storing a liquid food product.

The measuring tool 1 comprises five transducers 3, though any number is possible. The transducers 3 are configured to convert a characteristic of the delivered dose of radiation to another characteristic. When using more than two transducers 3, either the total measured characteristic values or an average may be used. In the embodiment shown, all five transducers 3 are charge collectors that convert emitted power of the delivered dose of radiation to an electrical charge.

By using many transducers 3 with relatively high spatial resolution, the measured delivered dose of radiation may be used as a spatial map of the radiation profile emitted, in a similar manner as CCD light sensors used in cameras.

In one embodiment, several transducers 3 with a predetermined spatial resolution are arranged in a two-dimensional matrix. The predetermined resolution is sufficiently high to differentiate each transducer 3 in the matrix from one other.

These transducers 3 may measure a two-dimensional map of the radiation profile emitted by the at least one electron beam emitter 2a-b. This spatial map may be displayed on a remote read-out system 9 as will be described later on.

The charge collectors 3 comprise charge collecting elements that may be made from metallic or semiconducting materials. These charge collecting elements may be arranged as wires or plates. In order to enhance stability over time of the charge collector 3, these charge collecting elements may be coated with a radiation resistant material.

At least one charge collector 3 may comprise at least one metallic or semiconducting wire inserted into a hollow tube of shielding 11 with at least one slit. This is advantageous in that it provides a reliable measurement of the delivered dose of radiation while exposing the charge collector 3 to a minimal amount of radiation.

The transducers 3 are configured to be insertable into the irradiation area 2. The irradiation area 2 is substantially flat, which means that the transducers 3 need to be substantially flat as well. The irradiation area 2 may e.g. be an irradiation tunnel formed by two or more electron emitters 2a-b or the immediate area in front of only one electron emitter 2a.

The transducers 3 are arranged in a frame 5, which holds the transducers 3 and is configured to insert the transducers 3 into the irradiation area 2.

The frame 5 may further be configured to be inserted into the into the irradiation area 2 with the transducers 3. Hence, the frame 5 is substantially flat at least in the part that is to be inserted into the irradiation area 2. The frame 5 may have any substantially flat shape, such as a rectangle, an oval or a slightly concave circle. The transducers 3 held in place by the frame 5 are arranged in the frame so that they are substantially flat in a common plane P as the frame 5 is (see FIG. 4).

The transducers 3 may comprise shielding 11 (see FIG. 2b) to direct radiation measurement at a specific direction, such as only one electron emitter 2a. The shielding 11 may e.g. comprise shielding metal such as stainless steel, lead, wolfram, tin, antimony, and/or bismuth. The shielding 11 may be substantially flat or slightly concave or convex in the common plane P as the frame 5.

By providing a shielding 11 on one side of a transducer 3, that transducer 3 may be said to be one-sided. By not providing a shielding 11 at least on the opposite sides of a transducer 3, that transducer 3 may be said to be double-sided. Several one-sided transducers 3 may be arranged in the frame 5 to either all face one side or alternate between different sides.

The shielding 11 may further comprise at least one slit. The slit(s) allows for only a fraction of the total emitted radiation to reach the transducer 3. As long as this fraction is enough to provide for a clear reading, the lowered radiation exposure will enhance stability over time of the transducer 3.

By providing a shielding 11 on all sides of a transducer 3 and at least one slit on only one side, the transducer 3 may be said to be one-sided. At least one slit may be arranged on the fully shielded opposite side of a one-sided transducer 3, which will turn it into a double-sided transducer 3 as radiation is now allowed to reach it from two sides.

The shielding 11 may be a hollow tube with at least one slit in the tube facing the direction of incoming radiation.

The transducers 3 may additionally or alternatively comprise filters such as a low energy filtering shielding 11. The low energy filtering shielding 11 filters the low energy electrons that creates noise in the measuring of the radiation dose. The filter may be a thin film and/or coating of shielding material operatively connected to ground voltage. Any component connected to ground may be separated from the measuring parts of the transducers 3, e.g. by air, an electrically insulating layer and/or a thermally insulating layer.

The frame 5 may be made from any material suitable for being inserted into or being in proximity to an irradiation area 2 and may be fabricated in one or more pieces.

The frame 5 may further comprise a handle 8. The handle 8 is configured to assist during the insertion of the at least one transducer 3 into the irradiation area 2. The handle 8 is arranged on a part of the frame 5 that is not inserted into the irradiation area 2 and therefore does not need to be substantially flat in the same plane as the frame 5 is. The handle 8 may have any shape suitable for manipulating the frame 5 easily, either by hand or by a machine, such as an opening, grooves or an end with high friction.

The handle 8 may additionally or alternatively be configured to stabilise the frame 5 while in use. This may be achieved by cooperating with stabilisers or holders arranged near the irradiation area 2 (shown in FIG. 4).

The measuring tool 1 further comprises at least one connector 7 configured to allow for signal transfers from the transducers 3 to a read-out system 9 remote of the irradiation area 2. In the embodiment shown with charge collectors 3, the signal transferred is an electrical charge which current is interpreted as the amount of delivered dose of radiation using known methods. The calculated delivered dose is then displayed on the read-out system 9.

The connectors 7 may for example be electrical cords, optical fibres, a thermal conductor or light beams with a corresponding receiver on the read-out system 9 end.

The read-out system 9 may be any kind of display such as a screen, projection, or hologram; or another type of interface such as a loudspeaker or a coloured light. The read-out system 9 may comprise any number of converters and processors for interpreting the received signal, such as a converter between thermal energy and electronic signals and a processor for interpreting the converted electronic signals as an amount of delivered dose of radiation using known methods. At least the interface should be viewable, hearable or interactable from outside of the irradiation area 2 in order to protect any user from unnecessary exposure to radiation.

The read-out system 9 may be comprised in the filling machine performing the irradiation. It may be beneficial to integrate the read-out system 9 and the controls to change 150 at least one setting of the at least one electron beam emitter 2a-b. The setting changed may for example be current, intensity, energy, exposure time or any other setting that influences the emitted radiation. At least one setting of the at least one electron beam emitter 2a-b may be configured to linearly change in relation to the speed of the processing of the packaging material.

In order to establish standard values for the correlation of the received signals and the delivered dose of radiation, prior art techniques may be used.

Figure 2A:
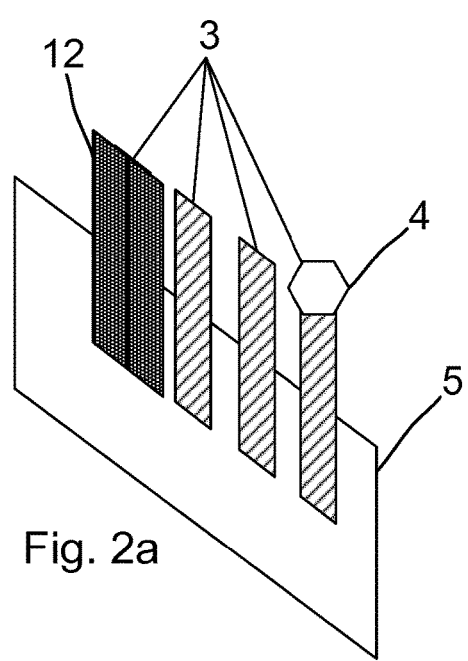
FIGS. 2a-c are perspective views of different transducers according to several different embodiments.
Figure 2B:
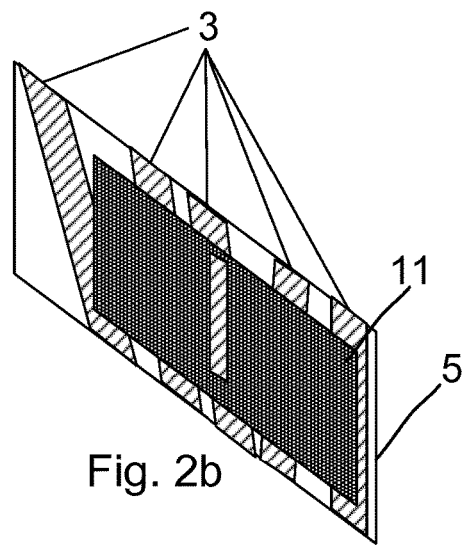
Figure 2C:
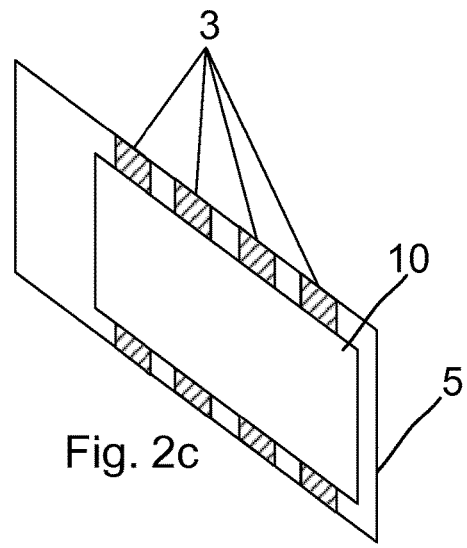

With reference to FIGS. 2a-c, different embodiments of transducers 3 arranged in a frame 5 will be described. FIG. 2a shows four thin film solid state detectors 3 that are arranged partially within the frame 5 and partially extending outside of the frame 5. By extending the transducers 3 outside of the frame 5, the frame 5 does not need to be inserted into the irradiation area 2 for the transducers 3 to be inserted.

Thin film solid state detectors 3 convert emitted radiation of the delivered dose of radiation to an electrical charge. The electrical charge is then transferred using the connectors 7 in a manner as discussed previously. The thin film solid state detectors 3 may be made from at least one active layer of thin films of doped or non-doped semiconductors that convert radiation in a known manner. The semiconductor used may e.g. be selected from a group consisting of silicon, germanium, silicon carbide and III-IV semiconductor compounds such as gallium arsenide or indium phosphide.

Some of the thin film solid state detectors 3 may be coated with a radiation resistant material in order to enhance stability over time as discussed previously as well as to filter out noise signals.

Some of the thin film solid state detectors 3 may be arranged as a multi-layered unit with different active layers separated by insulating and/or passive layers. The different active layers, being at different depths from the surface where radiation comes from, may provide a set of individual signals from which an information related to the energy of the impinging radiation may be derived.

FIG. 2a further shows the frame 5 comprising a shutter 12 that allows for alternatingly exposing at least one transducer 3 to the irradiation area 2. The shutter 12 in this embodiment comprises two movable radiation shielding plates 11, though it may comprise a set of any number of shielding units of any shape, at least one of them being movable. The shutter is operable by hand or automatically to move between a first position (shown in FIG. 2a) where the shielding plates 11 block radiation from reaching the at least one transducer 3 and a second position where the shielding plates 11 do not block radiation. The shutter 12 is advantageous in that it allows the at least one transducer 3 to be exposed to radiation only after environment stabilisation.

FIG. 2a further shows one of the transducers 3 being coupled to a cooling element 4. The cooling element 4 may for example be a fan, a plate heat exchanger or any other suitable element. The transducer 3 being coupled to the cooling element 4 may be any type of transducer 3 and any number of cooling elements 4 may be coupled to a transducer 3 and vice versa. The cooling element 4 may enhance dissipation of the collected emitted power of the delivered dose of radiation.

In an embodiment with at least one cooling element 4, the cooling element(s) 4 may be coupled to one or more passive elements 10, such as a metallic plate, to be inserted into the irradiation area 2. The cooling element 4 may then be configured to keep the one or more passive elements 10 at a fixed temperature while being exposed to the radiation of the irradiation area 2. By measuring the power consumed by the cooling element 4 in order to keep the temperature fixed and using connectors 7 either connected via a transducer 2 or directly to the cooling element 4, the delivered dose of radiation may be calculated and displayed in the read-out system 9.

FIG. 2b shows three scintillators 3 and two thin film solid state detectors 3 arranged at different angles in a frame 5. The transducers 3 also comprise a shielding 11 with a slit; it should however be noted that shielding 11 with or without slits may be used for any suitable type of transducer 3. The different angles may have an impact of the measured delivered dose of radiation, so by measuring at different angles a more representative average may be calculated.

Scintillators 3 convert emitted radiation of the delivered dose of radiation to light signals. The light signals are then transferred using the connectors 7, either through an optical fibre or through the air, and then received on the read-out system 9 end. The received light signals are interpreted using their intensity and/or frequency to correlate to an amount of delivered dose of radiation using mathematics or comparisons to known values gathered using prior art methods. The light signals may also be converted to electrical signals before being transmitted using the connectors 7 as described previously.

The scintillators 3 may for example be organic scintillators, plastic scintillators, inorganic scintillators, gaseous scintillators, glass scintillators or any suitable scintillator.

Parts of the scintillator 3 may be coated with a radiation resistant material in order to enhance stability over time of the signal and to filter out noise.

FIG. 2c shows four thermocouples 3 comprising metallic plates 10 arranged in a frame 5. Thermocouples 3 may convert emitted power of the delivered dose of radiation to heat. The heat may then be directly transferred to the read-out system 9 using heat conducting connecting means 7 or be converted to electrical or light signals before being transmitted as described previously. The heat is interpreted by measuring the temperature of the heated medium and correlating this to an amount of delivered dose of radiation as described previously.

The thermocouples 3 may for example be junction type thermocouples, nickel-alloy thermocouples, platinum/rhodium-alloy thermocouples, tungsten/rhenium-alloy thermocouples or any other suitable thermocouple or thermopile, preferably suitable for use at a wide temperature range of hundreds of Kelvin.

The thermocouples 3 may be configured to be directly exposed to the radiation or may further comprise at least one passive element 10, such as a metallic plate as seen in FIG. 2c. The passive element 10 may further increase the strength of the signal.

The thermocouples 3 may alternatively or additionally be configured to convert heat to electricity to be transmitted as described previously. The heat measured may be produced by the at least one passive element 10 as it is being irradiated.

The embodiments shown in FIGS. 2a-c are merely examples, and a skilled person will realise that any number and combination of transducers 3 arranged in a number of ways are possible within the scope of the subject-matter defined in the attached claims.

Figure 3A:
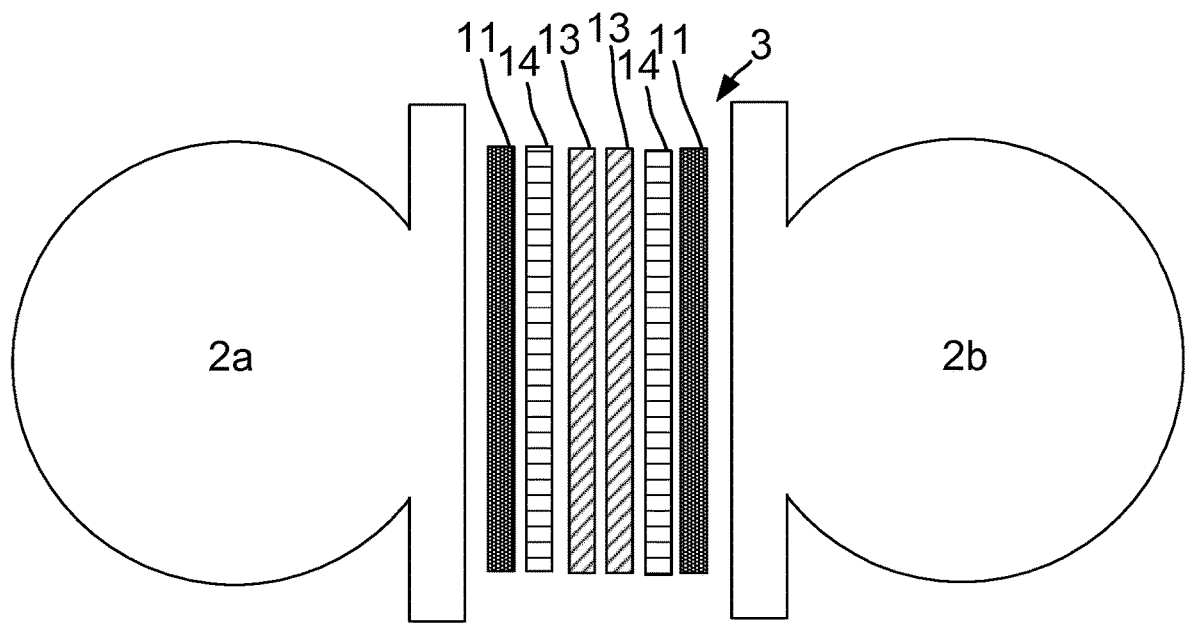
FIGS. 3a-b are side views of different transducers in use according to different embodiments.

FIG. 3a shows an embodiment of a transducer 3 comprising layers. The outermost layer is at least one shielding layer 11 directly exposed to impinging radiation. The shielding layer 11 may comprise any material suitable for blocking radiation. The shielding layer 11 may additionally be situated as an inner layer.

The transducer 3 of FIG. 3a further comprises at least one active layer 13. The active layer 13 is the active component of the transducer 3, configured to detect and transform radiation. The active layer 13 may e.g. be a metal plate or wire, a doped semiconductor, or a luminescent material. At least two active layers 13 may be arranged at different distances from the at least one electron beam emitter (2a-b), to provide a set of individual signals from which an information related to the energy of the impinging radiation may be derived.

The transducer 3 may further comprise at least one intermediate layer 14. At least one intermediate layer 14 is arranged between the shielding layer 11 and the active layer 13, however an intermediate layer 14 may also be arranged between two active layers 13 and several intermediate layers 14 may be provided between each set of other layers. The intermediate layer may be insulating in some way depending on the type of transducer 3. If the transducer 3 is a thermocouple, a thermal insulator may be beneficial. If the transducer 3 is a charge collector, an electrical insulator may be beneficial. If the transducer 3 is a scintillator, an optical insulator may be beneficial. Thusly, the intermediate layer 14 may comprise any number of materials including gases, plastic, silicon, metals, semiconductors or liquids.

Figure 3B:
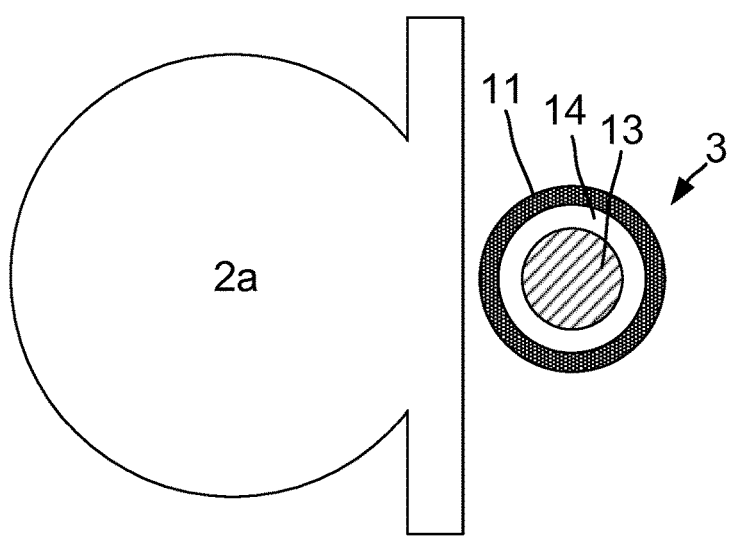

FIG. 3b shows another embodiment of a transducer 3 comprising layers. These layers are not planar. The active layer 13 is a wire inserted into a hollow tube of shielding 11. The shielding layer 11 may or may not comprise at least one slit. Between the shielding layer 11 and the wire 13 is an intermediate layer 14 consisting of air.

Figure 4:
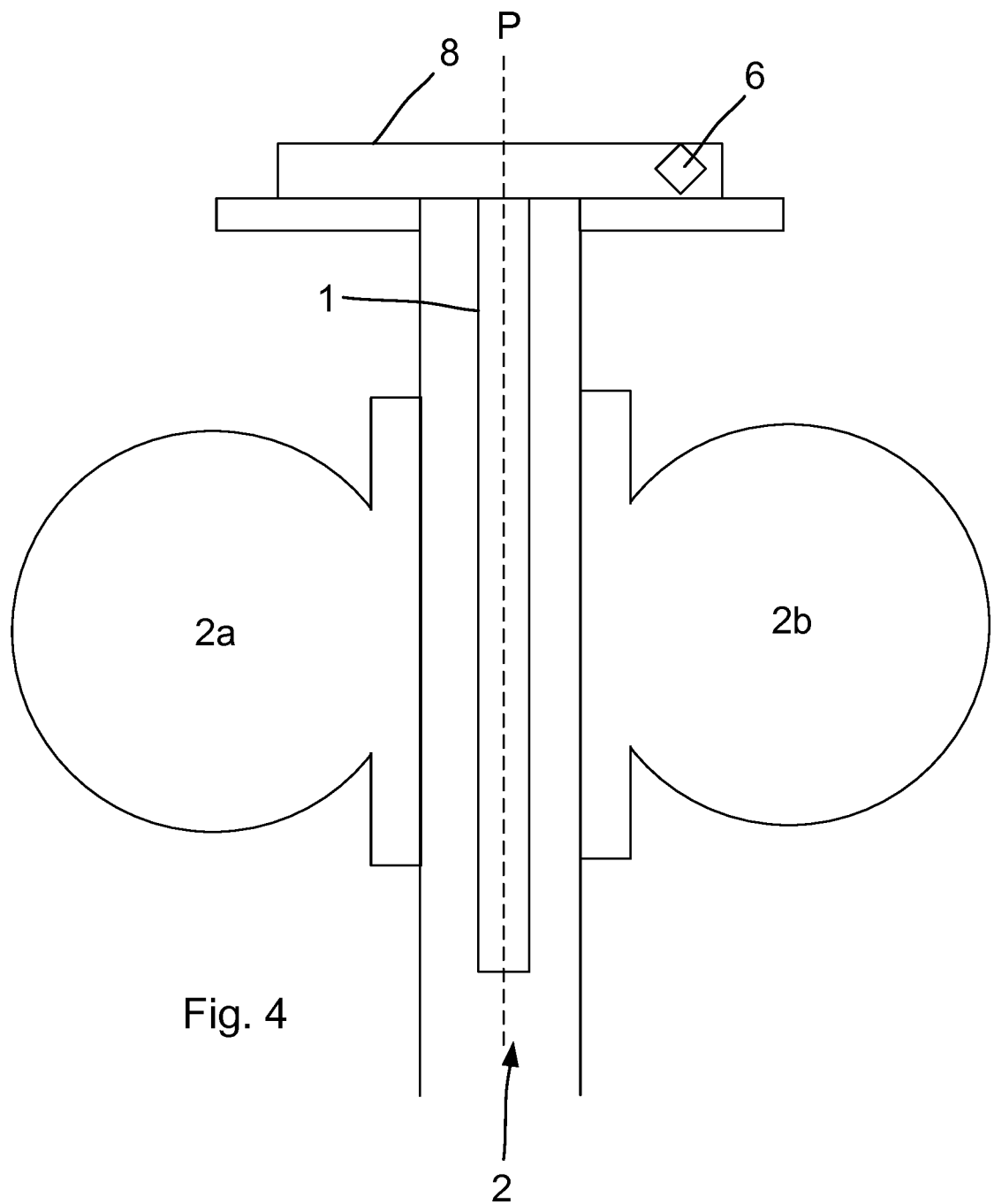
FIG. 4 is a side view of the measuring tool according to an embodiment in use.

FIG. 4 shows the measuring tool 1 in use. The measuring tool 1 is inserted into the upper part of the irradiation area 2 and irradiated by two electron beam emitters 2a-b. There may be any number of electron beam emitters 2a-b and many different implementations of the electron beam emitters 2a-b are possible.

The measuring tool 1 may additionally or alternatively be inserted into the bottom part of the irradiation area 2. The measuring tool 1 may be inserted during normal operation or preferably without the packaging material being in the irradiation area 2.

The frame 5 needs to be substantially flat enough to fit into the irradiation area 2 as seen and preferably holds the at least one transducer 3 such that the radiation emitted by the electron beam emitters 2a-b are able to be measured by the transducers 3. The frame 5 is 10-30 mm wide at its flattest part, preferably 20 mm. The frame 5 of FIG. 4 comprises a motor 6 being configured to provide automated insertion of the at least one transducer 3 into the irradiation area 2. The motor 6 and insertion movement may be achieved in any number of ways known by the skilled person to expose at least one transducer 3 to the irradiation area 2, such as extending the at least one transducer 3 out of the frame 5, moving the frame 5 itself, or activating a shutter 12.

Figure 5:
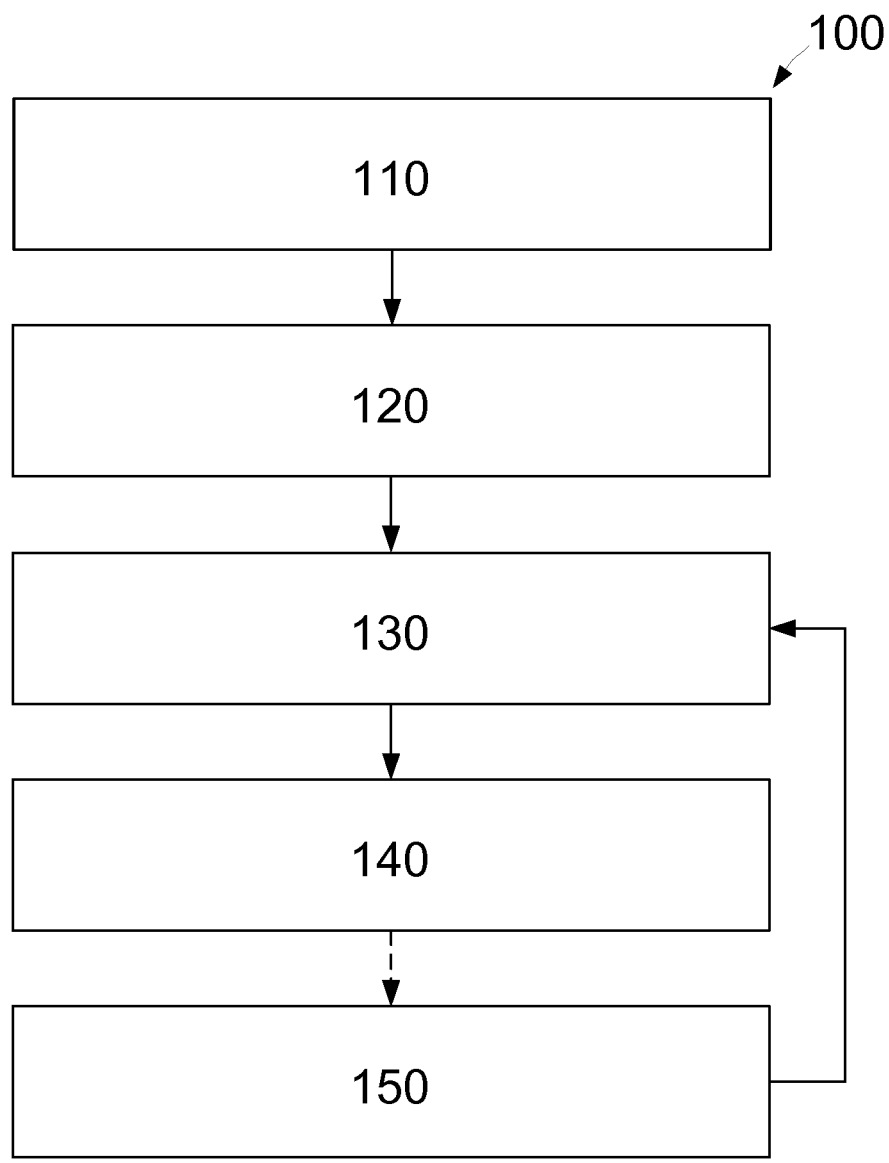
FIG. 5 is a schematic illustration of a method for sterilising a packaging material according to one embodiment.

FIG. 5 shows a schematic illustration of a method 100 for calibrating a radiation dose emitted by at least one electron beam emitter 2a-b in an irradiation area 2 used to sterilise packaging material to be later formed into a package. Calibrating the radiation dose may be interpreted as ensuring that the delivered dose of radiation is within a pre-determined acceptable range.

The method 100 shown in FIG. 5 is merely one example. The method 100 comprises several steps 110-150. These steps may be performed in any order, may be repeated any number of times or skipped entirely. Each step will thusly be described individually.

A removing step 110 comprises removing 110 the packaging material from the irradiation area 2 prior to inserting the at least one transducer 3. This step 110 may be performed by hand or automatically. By removing the packaging material before the delivered dose of radiation is measured, a more accurate measuring environment may be attained.

An inserting step 120 comprises inserting at least one transducer 3 into the irradiation area 2 using a frame 5. This step 120 may be performed by hand or automatically, e.g. using a motor 6 as described previously. The frame 5 may need to be rotated in order to fit into the irradiation area 2. It may be beneficial to align the frame 5 with the electron beam emitters 2a-b in order to achieve a strong signal. Removing the frame 5 and/or the at least one transducer 3 from the irradiation area 2 is not described in detail, however the Skilled Person will understand that anything inserted into the irradiation area 2 will be removed at some point.

A measuring step 130 comprises measuring the delivered dose of radiation emitted in the irradiation area 2 using the at least one transducer 3. Different measuring functions of the transducer 3 are described in detail previously and will not be repeated here.

A transmitting step 140 comprises transmitting the measurement to a read-out system 9 remote of the irradiation area 2 using at least one connector 7. The read-out system 9 then displays these measurements. The displaying may be visual, audial or using any other sense. The displayed measurement may be in exact detail, a map of the radiation profile emitted, an average, a total or a list of all measurements done. The displayed measurement may additionally or alternatively comprise displaying a warning if the measurement deviates from the pre-determined acceptable range.

The transmitting step 140 may be arranged to only transmit information if the measurement deviates from the pre-determined acceptable range. The pre-determined acceptable range may be set using industry expertise or prior measurements and evaluations.

A changing step 150 comprises changing at least one setting of the at least one electron beam emitter 2a-b. The setting changed may for example be intensity, energy, exposure time or any other setting that influences the emitted radiation.

The changing step 150 is preferably only performed if the displayed measurement deviates from the pre-determined acceptable range. If the delivered dose of radiation is measured 130 to be lower than the pre-determined acceptable range, the setting changed preferably increases the emitted radiation, and vice versa.

The embodiment of the method 100 shown in FIG. 5 has four steps 110-150. The inserting step 120 is performed first, followed by the measuring step 130. Next, the transmitting step 140 is performed and then the changing step 150 is performed if the transmitted measurement deviates from the pre-determined acceptable range. In order to ensure the changing step 150 has had the desired effect of setting the delivered dose of radiation within the pre-determined acceptable range, the measuring step 130 and the transmitting step 140 is repeated. If the delivered dose of radiation is within the pre-determined acceptable range, the method 100 is complete and the radiation dose emitted by the at least one electron beam emitter 2a-b is calibrated. If not, steps 130-150 are repeated until the delivered dose of radiation is within the pre-determined acceptable range.

From the description above follows that, although various embodiments of the invention have been described and shown, the invention is not restricted thereto, but may also be embodied in other ways within the scope of the subject-matter defined in the following claims.

The invention claimed is:

1. A measuring tool for measuring a delivered dose of radiation emitted by at least one electron beam emitter in an irradiation area used to sterilise packaging material to be later formed into a package, the measuring tool comprising:
   a frame extending between a first end and a second end, the frame removably insertable into the irradiation area, wherein the irradiation area is flat;
   at least one transducer held in the frame between the first end of the frame and the second end of the frame, the at least one transducer configured to convert a characteristic of the delivered dose of radiation to another characteristic, wherein the frame and the at least one transducer are in a common plane, and wherein the at least one transducer is flat; and
   at least one connector configured to allow signal transfer from the at least one transducer to a read-out system remote of the irradiation area,
   wherein the frame is configured to removably insert the at least one transducer into the irradiation area during operation of the at least one electron beam emitter,
   wherein the frame comprises a first handle at the first end of the frame and a second handle at the second end of the frame,
   wherein each of the first handle and second handle are configured to be held by a holder in order to stabilise the frame in the irradiation area.

2. The measuring tool according to claim 1, wherein at least one of the at least one transducer is a thermocouple coupled with at least one metallic plate.

3. The measuring tool according to claim 1, wherein at least one of the at least one transducer is a charge collector comprising at least one metallic or semiconducting element.

4. The measuring tool according to claim 3, wherein at least one charge collector comprises at least one metallic or semiconducting wire inserted into a hollow tube of shielding with at least one slit.

5. The measuring tool according to claim 1, wherein at least one of the at least one transducer is a scintillator.

6. The measuring tool according to claim 1, wherein at least one of the at least one transducer is a thin film solid state detector.

7. The measuring tool according to claim 6, wherein at least one thin film solid state detector comprises at least two active layers arranged at different distances from the at least one electron beam emitter.

8. The measuring tool according to claim 1, wherein at least one transducer is coupled to a cooling element; wherein the cooling element is coupled to a metallic plate to be inserted into the irradiation area and configured to keep the metallic plate at a fixed temperature.

9. The measuring tool according to claim 1, wherein at least one transducer further comprises a shielding with at least one slit.

10. The measuring tool according to claim 1, wherein at least one transducer comprises:
    at least one shielding layer directly exposed to impinging radiation;
    at least one active layer for detecting radiation; and
    at least one intermediate insulating layer between the at least one shielding layer and the at least one active layer.

11. The measuring tool according to claim 1, wherein the frame comprises a shutter that allows for alternatingly exposing at least one of the at least one transducer to the irradiation area.

12. The measuring tool according to claim 1, wherein the frame comprises a motor being configured to provide automated insertion of the at least one transducer into the irradiation area.

13. The measuring tool according to claim 1, wherein the frame comprises a handle configured to assist during the insertion of the at least one transducer into the irradiation area and to stabilise the frame while in use.

14. Use of a measuring tool according to claim 1 in order to measure a radiation dose emitted by at least one electron beam emitter in an irradiation area.

15. A method for calibrating a radiation dose emitted by at least one electron beam emitter in an irradiation area used to sterilise packaging material to be later formed into a package; the method comprising:
    inserting into the irradiation area, during operation of the at least one electron beam emitter, a frame with at least one transducer held in the frame between a first end of the frame and a second end of the frame, wherein the frame, the at least one transducer, and the irradiation area are flat, and wherein the frame and the at least one transducer are in a common plane;
    measuring the radiation dose emitted in the irradiation area using the at least one transducer;
    transmitting the measurement to a read-out system remote of the irradiation area using at least one connector; and
    removing, during operation of the at least one electron beam emitter, the frame and the at least one transducer from the irradiation area,
    wherein the frame comprises a first handle at the first end of the frame and a second handle at the second end of the frame,
    wherein each of the first handle and second handle are configured to be held by a holder in order to stabilise the frame in the irradiation area.

* * * * *